US012467529B2

(12) United States Patent
Wakui et al.

(10) Patent No.: US 12,467,529 B2
(45) Date of Patent: Nov. 11, 2025

(54) POWER TRANSMISSION DEVICE

(71) Applicant: HONDA MOTOR CO., LTD., Tokyo (JP)

(72) Inventors: Takashi Wakui, Saitama (JP); Motoshi Togasaki, Saitama (JP); Masahiro Imai, Saitama (JP); Kazuki Sakurai, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/796,894

(22) Filed: Aug. 7, 2024

(65) Prior Publication Data

US 2025/0052316 A1 Feb. 13, 2025

(30) Foreign Application Priority Data

Aug. 7, 2023 (JP) .................. 2023-128805

(51) Int. Cl.
 *F16H 57/04* (2010.01)
 *F16H 57/021* (2012.01)
 *F16H 57/02* (2012.01)

(52) U.S. Cl.
 CPC ....... *F16H 57/0483* (2013.01); *F16H 57/021* (2013.01); *F16H 57/0423* (2013.01); *F16H 57/0424* (2013.01); *F16H 57/045* (2013.01); *F16H 57/0457* (2013.01); *F16H 57/0471* (2013.01); *F16H 2057/02052* (2013.01)

(58) Field of Classification Search
 CPC ............. F16H 57/0483; F16H 57/0423; F16H 57/0424; F16H 57/045; F16H 57/0457; F16H 57/0471; F16H 57/0495; F16H 57/021; F16H 2057/02052
 See application file for complete search history.

(56) References Cited

U.S. PATENT DOCUMENTS

| 4,222,283 | A * | 9/1980 | Nagy | ...................... F16H 3/089 184/6.12 |
| 7,900,535 | B2 * | 3/2011 | Usami | ................. F16H 57/0426 184/6.12 |
| 8,079,445 | B2 * | 12/2011 | Aoyama | ............. F16H 57/0423 184/6.12 |
| 9,074,679 | B2 * | 7/2015 | Araki | .................. F16H 57/0457 |
| 9,581,236 | B2 * | 2/2017 | Tage | ................... F16H 57/0431 |
| 10,385,963 | B2 * | 8/2019 | Torii | ................... F16H 57/0423 |

(Continued)

FOREIGN PATENT DOCUMENTS

JP 2004-180477 A 6/2004

*Primary Examiner* — Timothy Hannon
(74) *Attorney, Agent, or Firm* — Paratus Law Group, PLLC

(57) ABSTRACT

A power transmission device includes: a first rotation member; a first rotation shaft supporting the first rotation member; and a case rotatably supporting the first rotation shaft, in which the case includes a rotation member accommodation chamber accommodating the first rotation shaft and the first rotation member, a first storage portion provided at a bottom portion of the rotation member accommodation chamber and configured to store a lubricating liquid such that a portion of the first rotation member is immersed therein, and a second storage portion provided above the first rotation shaft in the rotation member accommodation chamber and configured to store the lubricating liquid.

8 Claims, 14 Drawing Sheets

(56) References Cited

U.S. PATENT DOCUMENTS

| | | |
|---|---|---|
| 2004/0154846 A1 | 8/2004 | Kira |
| 2013/0283955 A1* | 10/2013 | Araki .................... F16H 57/043 74/467 |
| 2015/0204436 A1* | 7/2015 | Mafune ............... F16H 57/0409 475/160 |
| 2019/0145509 A1* | 5/2019 | Yu ....................... F16H 57/0421 184/11.1 |
| 2024/0247711 A1* | 7/2024 | Nagata ................ F16H 37/0813 |
| 2025/0020201 A1* | 1/2025 | Henn ................... F16H 57/045 |

* cited by examiner

POWER TRANSMISSION DEVICE

CROSS-REFERENCE TO RELATED APPLICATIONS

This application is based on and claims priority under 35 USC 119 from Japanese Patent Application No. 2023-128805 filed on Aug. 7, 2023, the entire content of which is incorporated herein by reference.

TECHNICAL FIELD

The present invention relates to a power transmission device.

BACKGROUND ART

In recent years, as a specific countermeasure against global climate change, efforts toward realization of a low-carbon society or a decarbonized society are activated. Reduction in $CO_2$ emission and an improvement in energy efficiency in a vehicle such as an automobile are also required, and electrification of a drive source is progressing.

Along with the electrification of the drive source, a power transmission device has been downsized in recent years. In particular, it is effective to maintain a height of the power transmission device at a low level in order to improve a degree of freedom in mounting the power transmission device onto a vehicle and to enlarge a passenger compartment.

In a power transmission device in related art, a lubricating liquid is stored in a lower portion of a case, a part of a rotation member such as a gear or a sprocket is immersed in the lubricating liquid, and the lubricating liquid is picked up along with rotation of the rotation member to lubricate a gear or a bearing provided in the power transmission device (for example, JP2004-180477A).

In a power transmission device having a low height, when a lubricating oil is supplied by pick-up of a rotation member as in the related art, there is a problem that a volume of the rotation member immersed in the lubricating oil increases, and agitation loss increases. On the other hand, when an amount of the lubricating oil is reduced to reduce the volume of the rotation member immersed in the lubricating oil, appropriate lubrication may be hindered.

An object of the present invention is to provide a power transmission device that can appropriately supply a lubricating liquid while reducing agitation loss.

SUMMARY OF INVENTION

According to an aspect of the present invention, there is provided a power transmission device including:
 a first rotation member;
 a first rotation shaft supporting the first rotation member; and
 a case rotatably supporting the first rotation shaft, in which
 the case includes
  a rotation member accommodation chamber accommodating the first rotation shaft and the first rotation member,
  a first storage portion provided at a bottom portion of the rotation member accommodation chamber and configured to store a lubricating liquid such that a portion of the first rotation member is immersed therein, and
  a second storage portion provided above the first rotation shaft in the rotation member accommodation chamber and configured to store the lubricating liquid.

DESCRIPTION OF EMBODIMENTS

Figure 1:
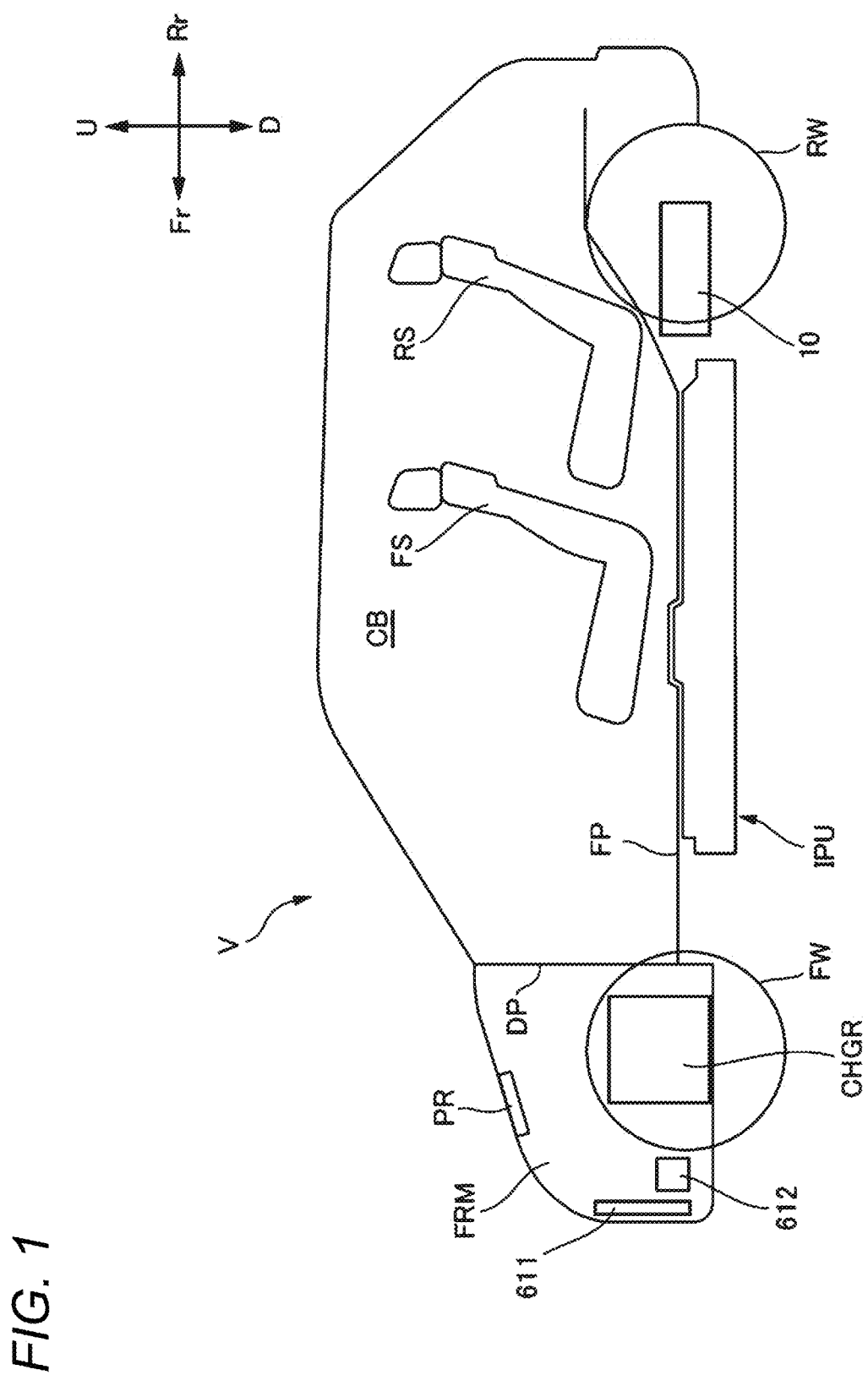
FIG. 1 is a schematic view of a vehicle on which a drive unit 10 according to an embodiment of the present invention is mounted as viewed from a left side.

Hereinafter, a vehicle on which a drive unit according to an embodiment of the present invention will be described with reference to the accompanying drawings. The drawings are viewed in directions of reference numerals. In the present specification and the like, in order to simplify and clarify the description, a front-rear direction, a left-right direction, and an upper-lower direction are described according to directions viewed from a driver of a vehicle. In the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

The vehicle V includes a drive unit 10 serving as a drive source, a battery pack IPU for storing electric power to be supplied to the drive unit 10, a charge and power supply control device CHGR for controlling input and output electric power of the battery pack IPU, a power-receiving portion PR capable of receiving electric power from an external power supply, a radiator 611 through which cooling water R1 for cooling a control device 50 to be described later of the drive unit 10 flows, and a cooling water pump 612 for pumping the cooling water R1. The cooling water R1 is, for example, cooling water called a long life coolant (LLC).

The drive unit 10 is disposed behind the rear seat RS and below the floor panel FP. The battery pack IPU is disposed below the floor panel FP and below a floor of the passenger compartment CB. The battery pack IPU accommodates a plurality of battery modules in which a plurality of battery cells are stacked. Each battery cell is a secondary battery that can be charged and discharged, such as a lithium ion battery or an all-solid-state battery.

The charge and power supply control device CHGR is accommodated in the front room FRM. The power-receiving portion PR is provided on an upper surface of the front room FRM and is electrically connected to the charge and power supply control device CHGR. The radiator 611 is accommodated in the front room FRM, and is disposed in the vicinity of a front end in the front room FRM. The radiator 611 is a heat exchanger for cooling the cooling water R1 by heat exchange between the flowing cooling water R1 and external air due to driving wind of the vehicle V. The cooling water pump 612 is accommodated in the front room FRM.

[Overall Configuration of Drive Unit]

Figure 2:
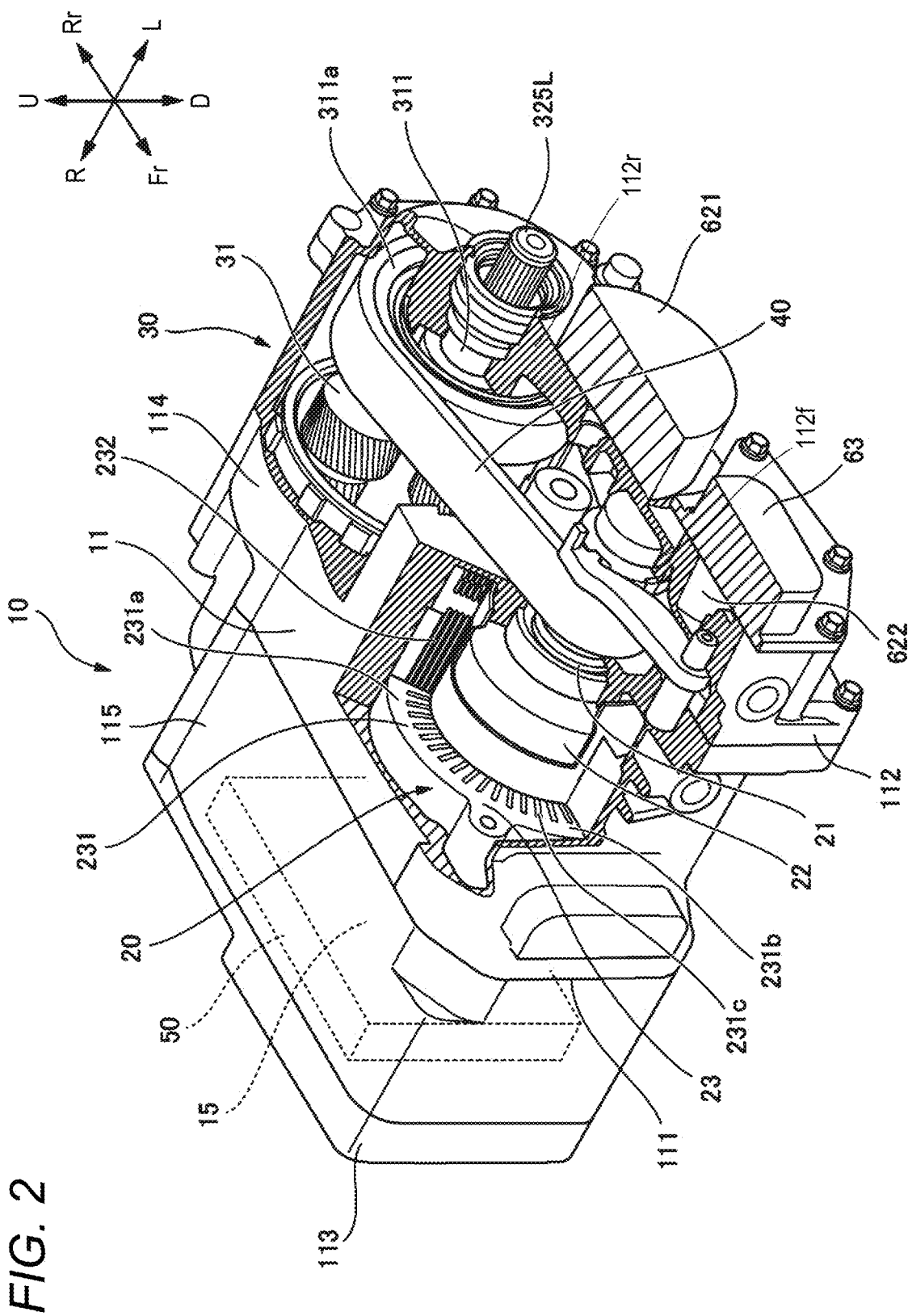
FIG. 2 is a cutaway perspective view of a part of the drive unit 10 of the embodiment of the present invention.
Figure 3:
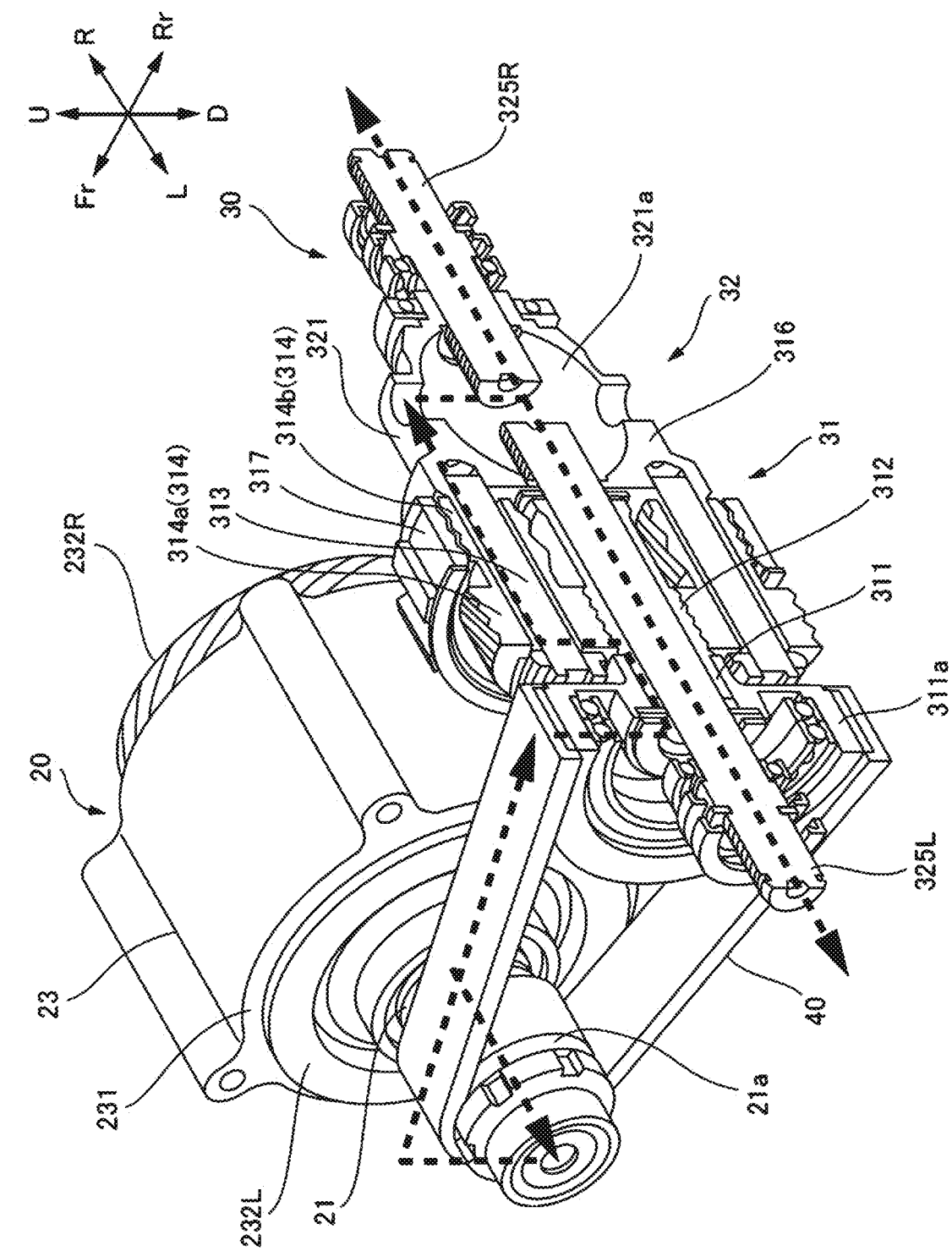
FIG. 3 is a partial cross-sectional perspective view showing a power transmission path in the drive unit 10 in FIG. 2.

As shown in FIGS. 2 and 3, the drive unit 10 includes a drive motor 20, a deceleration device 30 that reduces power output from the drive motor 20 and outputs the reduced power to the outside, a power transmission chain 40 for transmitting the power output from the drive motor 20 to the deceleration device 30, the control device 50 for controlling the drive motor 20, an oil pump 621 for pumping a motor cooling oil R2, and an oil cooler 63 for performing heat exchange between the cooling water R1 and the motor cooling oil R2. The motor cooling oil R2 is, for example, an oil called an automatic transmission fluid (ATF).

In the drive unit 10, the drive motor 20, the deceleration device 30, the power transmission chain 40, and the control device 50 are accommodated in a drive unit case 11. The oil pump 621 and the oil cooler 63 are attached to a left side surface of the drive unit case 11.

The drive motor 20 is a so-called inner rotor motor that includes a drive shaft 21, a rotor 22 that is attached to the drive shaft 21 and rotates integrally with the drive shaft 21, and a stator 23 that is disposed on a radial direction outer side of the rotor 22 in a manner of facing the rotor 22 in the radial direction with a slight gap therebetween.

In the present embodiment, in the drive unit 10, the drive motor 20 is disposed such that an axial direction (that is, the drive shaft 21) is horizontally oriented in the left-right direction. In this way, since the drive shaft 21 is oriented in the horizontal direction, an upper-lower dimension of the drive unit 10 can be compact.

The stator 23 includes a stator core 231 and a coil 232 that is attached to the stator core 231 and includes a plurality of windings of a U-phase, a V-phase, and a W-phase.

The stator core 231 is formed by stacking, in the axial direction, a plurality of thin plate-shaped electromagnetic steel sheets each having a substantially annular shape.

The stator core 231 includes a yoke portion 231*a* having a substantially annular shape that forms an outer ring portion of the stator core 231 when viewed in the axial direction, and a plurality of teeth portions 231*b* that protrude in the radial direction from an inner peripheral surface of the yoke portion 231*a* toward a center. The plurality of teeth portions 231*b* are disposed at equal intervals along a circumferential direction of the stator core 231 when viewed in the axial direction. A slot portion 231*c* is formed between the teeth portions 231*b* adjacent in the circumferential direction of the stator core 231. A plurality of slot portions 231*c* are formed at equal intervals along the circumferential direction of the stator core 231. The teeth portions 231*b* and the slot portions 231*c* extend along the axial direction of the stator core 231.

The coil 232 includes a plurality of conductor segments inserted into the slot portions 231*c* of the stator core 231. The conductor segments are inserted into all of the plurality of slot portions 231*c* formed along the circumferential direction of the stator core 231.

The coil 232 includes a left coil end 232L that protrudes outward in the axial direction from a left end surface on one side in the axial direction of the stator core 231, and a right coil end 232R that protrudes outward in the axial direction from a right end surface on the other side in the axial direction of the stator core 231.

A drive sprocket 21*a* around which the power transmission chain 40 is wound is attached to a left end of the drive shaft 21. The drive sprocket 21*a* rotates integrally with the drive shaft 21.

Figure 4:
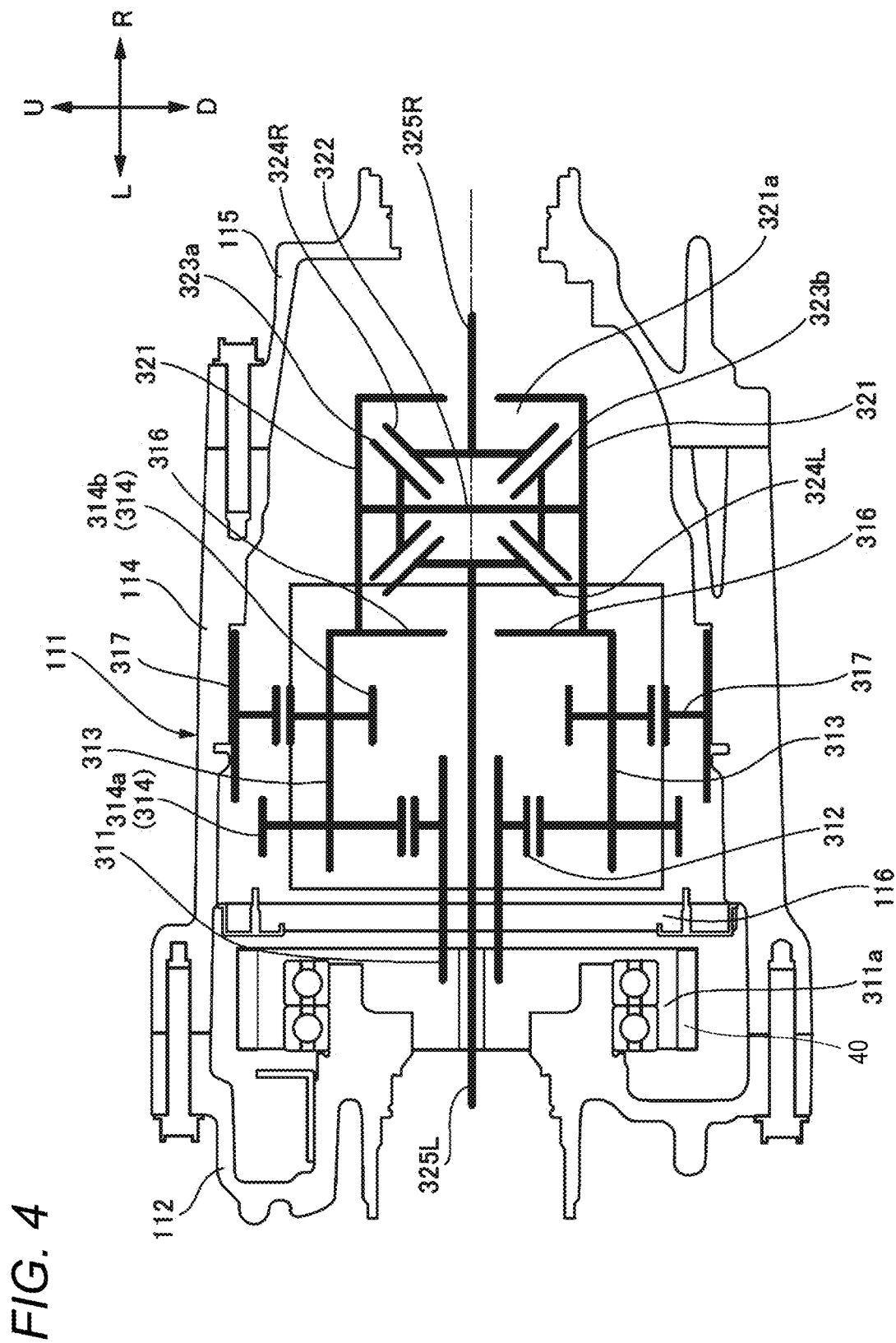
FIG. 4 is a skeleton diagram of a deceleration device in the drive unit 10 in FIG. 2.
Figure 5:
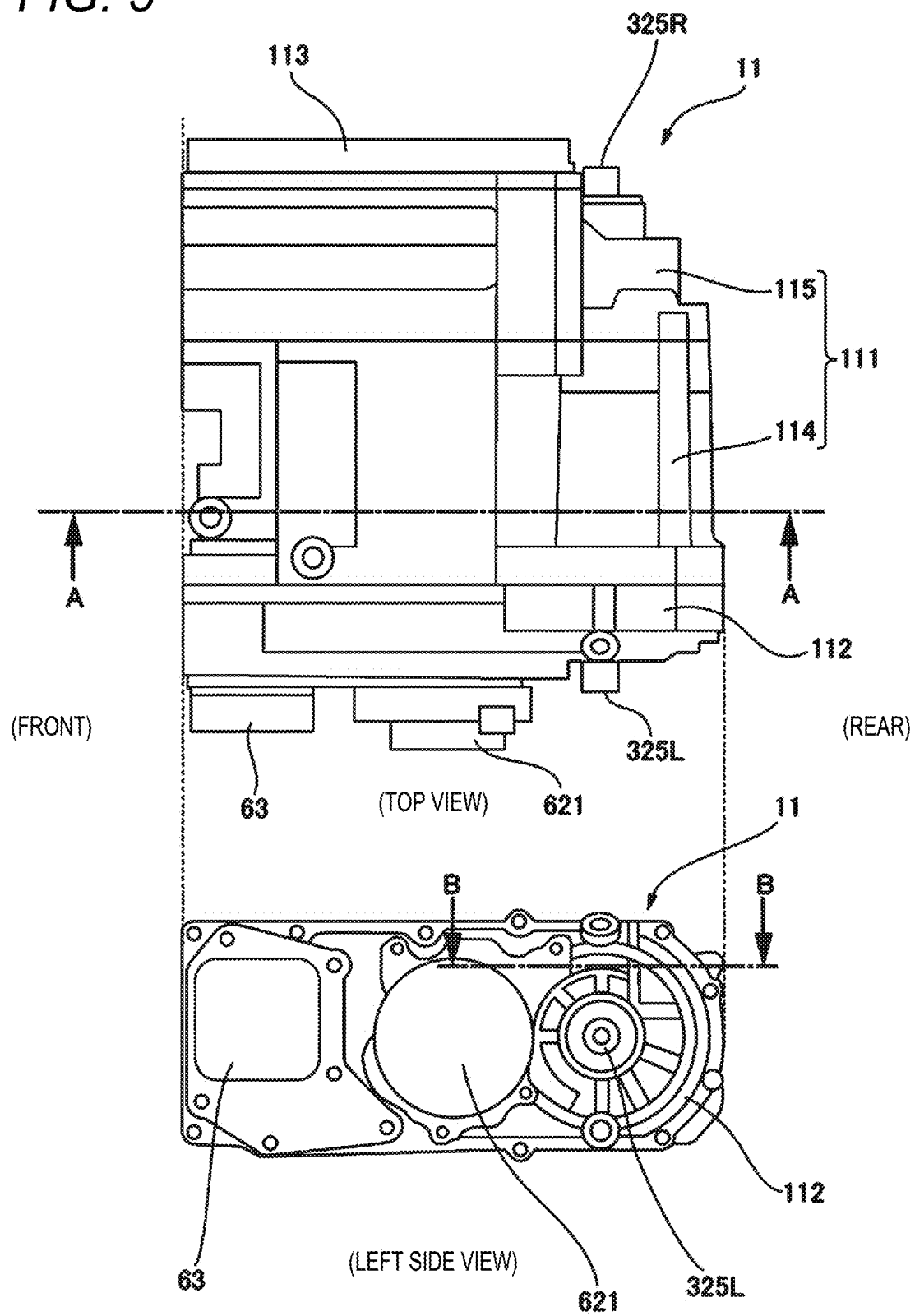
FIG. 5 is a top view and a left side view of the drive unit 10 in FIG. 2.

As shown in FIGS. 3 and 4, the deceleration device 30 includes a planetary gear mechanism 31 and a differential gear mechanism 32.

First, the planetary gear mechanism 31 will be described.

The planetary gear mechanism 31 includes an input shaft 311, a sun gear 312, a plurality of planetary pinion shafts 313, the same number of stepped pinions 314 as the planetary pinion shafts 313, a planetary carrier 316, and a ring gear 317.

In the present embodiment, the planetary gear mechanism 31 is aligned behind the drive motor 20 in the front-rear direction. The planetary gear mechanism 31 is disposed such that an axial direction (that is, the input shaft 311) is parallel to the axial direction of the drive motor 20 and is oriented in the left-right direction. The input shaft 311 of the planetary gear mechanism 31 is disposed at substantially the same height as the drive shaft 21 of the drive motor 20 in the upper-lower direction. Further, an outer diameter dimension of the planetary gear mechanism 31 is substantially the same dimension as an outer diameter dimension of the drive motor 20, and a height of the drive unit 10 is small in the upper-lower direction.

The input shaft 311 is a hollow shaft into which a left drive shaft to be described later is inserted. A driven sprocket 311*a* around which the power transmission chain 40 is wound is attached to a left end of the input shaft 311. The driven sprocket 311*a* rotates integrally with the input shaft 311. The driven sprocket 311*a* has a larger diameter than the drive sprocket 21*a* attached to the drive shaft 21 of the drive motor 20, and the number of teeth of the driven sprocket 311*a* is larger than the number of teeth of the drive sprocket 21*a*.

The sun gear 312 is an external gear provided on the input shaft 311, and rotates integrally with the input shaft 311 about the same rotation axis.

The plurality of planetary pinion shafts 313 are disposed at equal intervals in a circumferential direction along an outer peripheral surface of the sun gear 312 in a manner of being oriented in the left-right direction parallel to the input shaft 311 on a radial direction outer side of the sun gear 312. In the present embodiment, four planetary pinion shafts 313 are disposed on the radial direction outer side of the sun gear 312 at intervals of 90 degrees in the circumferential direction along the circumferential direction of the input shaft 311.

The stepped pinion 314 including a first planetary gear 314a and a second planetary gear 314b that rotate integrally is pivotally supported by each planetary pinion shaft 313 in a freely rotatable manner. In the present embodiment, on each planetary pinion shaft 313, the first planetary gear 314a is disposed on the left side and the second planetary gear 314b is disposed on the right side. Therefore, four first planetary gears 314a and four second planetary gears 314b are disposed in an annular shape at intervals of 90 degrees along the circumferential direction of the input shaft 311.

Each first planetary gear 314a is an external gear that is disposed on the outer peripheral surface of the sun gear 312 and meshes with the sun gear 312. The four first planetary gears 314a are provided in an annular shape at intervals of 90 degrees along the outer peripheral surface of the sun gear 312. The four first planetary gears 314a mesh with the outer peripheral surface of the sun gear 312.

Each second planetary gear 314b is an external gear that is disposed on an inner peripheral surface of the ring gear 317 and meshes with the ring gear 317. The four second planetary gears 314b are provided in an annular shape at intervals of 90 degrees along the inner peripheral surface of the ring gear 317. In the present embodiment, each second planetary gear 314b is an external gear having a smaller diameter than the first planetary gear 314a.

The planetary carrier 316 couples the four planetary pinion shafts 313. The planetary carrier 316 is rotatable about a rotation axis coaxial with the input shaft 311 (and the sun gear 312) integrally with the four planetary pinion shafts 313.

Therefore, the stepped pinion 314 including the first planetary gear 314a and the second planetary gear 314b is freely rotatable about the planetary pinion shaft 313 as an axis, and is freely revolvable about the rotation axis coaxial with the input shaft 311 (and the sun gear 312) integrally with the planetary pinion shaft 313. The planetary carrier 316 rotates integrally with a revolutionary motion of the stepped pinion 314 on the rotation axis coaxial with the input shaft 311 (and the sun gear 312).

The ring gear 317 is an annular internal gear that surrounds the four second planetary gears 314b disposed in an annular shape and whose inner peripheral surface meshes with the second planetary gears 314b. In the present embodiment, the ring gear 317 is fixed to the drive unit case 11, and the ring gear 317 does not rotate.

Next, the differential gear mechanism 32 will be described.

The differential gear mechanism 32 includes a differential case 321, a differential pinion shaft 322 supported by the differential case 321, a first bevel gear 323a and a second bevel gear 323b pivotally supported by the differential pinion shaft 322 in a freely pivotable manner, a left side gear 324L and a right side gear 324R meshing with the first bevel gear 323a and the second bevel gear 323b, and a left drive shaft 325L and a right drive shaft 325R.

The differential case 321 is formed integrally with the planetary carrier 316 of the planetary gear mechanism 31. Therefore, the differential case 321 rotates about the rotation axis coaxial with the input shaft 311 integrally with the planetary carrier 316 of the planetary gear mechanism 31. The differential case 321 includes an accommodating portion 321a that accommodates the differential pinion shaft 322, the first bevel gear 323a, the second bevel gear 323b, the left side gear 324L, and the right side gear 324R.

The differential pinion shaft 322 is accommodated in the accommodating portion 321a of the differential case 321 and is supported by the differential case 321. The differential pinion shaft 322 is disposed in the accommodating portion 321a of the differential case 321 in a manner of being orthogonal to the rotation axis of the differential case 321. The differential pinion shaft 322 rotates integrally with the differential case 321 about the rotation axis of the differential case 321.

The first bevel gear 323a is accommodated in the accommodating portion 321a of the differential case 321 and is pivotally supported by the differential pinion shaft 322 in a freely rotatable manner. The first bevel gear 323a has a substantially truncated conical shape whose upper surface is oriented toward the rotation axis of the differential case 321, and a gear is formed on a side surface of the truncated cone.

The second bevel gear 323b is accommodated in the accommodating portion 321a of the differential case 321 and is pivotally supported by the differential pinion shaft 322 in a freely rotatable manner of facing the first bevel gear 323a. The second bevel gear 323b has a substantially truncated conical shape whose upper surface is oriented toward the rotation axis of the differential case 321, and a gear is formed on a side surface of the truncated cone.

The left side gear 324L is accommodated in the accommodating portion 321a of the differential case 321, and is disposed between the first bevel gear 323a and the second bevel gear 323b on the left side of the differential pinion shaft 322. A rotation axis of the left side gear 324L is coaxial with the rotation axis of the differential case 321. The left side gear 324L has a substantially truncated conical shape whose upper surface is oriented toward the differential pinion shaft 322 (that is, rightward), and a gear is formed on a side surface of the truncated cone. The left side gear 324L meshes with both the first bevel gear 323a and the second bevel gear 323b.

The right side gear 324R is accommodated in the accommodating portion 321a of the differential case 321, and is disposed between the first bevel gear 323a and the second bevel gear 323b on the right side of the differential pinion shaft 322 in a manner of facing the left side gear 324L in the left-right direction with the differential pinion shaft 322 interposed therebetween. A rotation axis of the right side gear 324R is coaxial with the rotation axis of the differential case 321 and the rotation axis of the left side gear 324L. The right side gear 324R has a substantially truncated conical shape whose upper surface is oriented toward the differential pinion shaft 322 (that is, leftward), and a gear is formed on a side surface of the truncated cone. The right side gear 324R meshes with both the first bevel gear 323a and the second bevel gear 323b.

The left drive shaft 325L is inserted through a hollow portion of the input shaft 311 of the planetary gear mechanism 31 and a center of the driven sprocket 311a, and extends in the left-right direction coaxially with the rotation axis of the input shaft 311 of the planetary gear mechanism 31 and the rotation axis of the differential case 321. The left side gear 324L is attached to a right end of the left drive shaft 325L, and the left rear wheel RW is attached to a left end of the left drive shaft 325L. Therefore, the left side gear 324L, the left drive shaft 325L, and the left rear wheel RW rotate integrally.

The right drive shaft 325R extends in the left-right direction coaxially with the rotation axis of the input shaft 311 of the planetary gear mechanism 31, the rotation axis of the differential case 321, and the rotation axis of the left drive shaft 325L. The right side gear 324R is attached to a left end of the right drive shaft 325R, and the right rear wheel RW is attached to a right end of the right drive shaft 325R. Therefore, the right side gear 324R, the right drive shaft 325R, and the right rear wheel RW rotate integrally.

Next, a power transmission path of power output from the drive motor 20 will be described.

Power generated by the drive motor 20 is output from the drive shaft 21, and the drive sprocket 21a attached to the drive shaft 21 rotates integrally with the drive shaft 21. When the drive sprocket 21a rotates, the driven sprocket 311a rotates due to the power transmission chain 40 wound around the drive sprocket 21a and the driven sprocket 311a attached to the input shaft 311 of the planetary gear mechanism 31. The input shaft 311 of the planetary gear mechanism 31 rotates integrally with the driven sprocket 311a. At this time, since the number of teeth of the driven sprocket 311a is larger than the number of teeth of the drive sprocket 21a, the rotation of the drive shaft 21 is reduced via the drive sprocket 21a, the power transmission chain 40, and the driven sprocket 311a, and is input to the input shaft 311 of the planetary gear mechanism 31.

In the planetary gear mechanism 31, the power input to the input shaft 311 is transmitted to the stepped pinion 314 via the sun gear 312. The stepped pinion 314 rotates while revolving. The planetary carrier 316 rotates integrally with the revolution of the stepped pinion 314. In the planetary gear mechanism 31, since the ring gear 317 is fixed, the rotation of the input shaft 311 is reduced at a predetermined reduction ratio and transmitted to the planetary carrier 316.

In the differential gear mechanism 32, the differential case 321 is formed integrally with the planetary carrier 316 of the planetary gear mechanism 31, and thus rotates integrally with the rotation of the planetary carrier 316. Therefore, the power input to the input shaft 311 of the planetary gear mechanism 31 is reduced at the predetermined reduction ratio and input to the differential case 321 via the planetary carrier 316.

Therefore, the power output from the drive shaft 21 is input to the differential case 321 of the differential gear mechanism 32 via the power transmission chain 40 and the planetary gear mechanism 31, and the differential pinion shaft 322 revolves about the rotation axis of the differential case 321 together with the differential case 321.

When the vehicle V travels straight, there is no rotation difference between the left and right rear wheels RW, and thus the left side gear 324L and the right side gear 324R that mesh with the first bevel gear 323a and the second bevel gear 323b rotate according to rotation of the differential pinion shaft 322. The left rear wheel RW rotates when the left drive shaft 325L rotates integrally with the rotation of the left side gear 324L, and the right rear wheel RW rotates when the right drive shaft 325R rotates integrally with the rotation of the right side gear 324R.

When the vehicle V turns, the differential pinion shaft 322 revolves, the first bevel gear 323a and the second bevel gear 323b rotate such that a rotation speed of the rear wheel RW on an inner side during turning decreases whereas a rotation speed of the rear wheel RW on an outer side during turning increases, and meanwhile, the left side gear 324L and the right side gear 324R that mesh with the first bevel gear 323a and the second bevel gear 323b rotate at different rotation speeds such that the rotation speed of the rear wheel RW on the inner side during turning decreases whereas the rotation speed of the rear wheel RW on the outer side during turning increases. The left rear wheel RW rotates when the left drive shaft 325L rotates integrally with the rotation of the left side gear 324L, and the right rear wheel RW rotates when the right drive shaft 325R rotates integrally with the rotation of the right side gear 324R. Therefore, when the vehicle V turns, the left drive shaft 325L and the right drive shaft 325R rotate such that the rotation speed of the rear wheel RW on the inner side during turning decreases whereas the rotation speed of the rear wheel RW on the outer side during turning increases.

In this way, as indicated by arrows in FIG. 3, the power output from the drive motor 20 is reduced via the drive sprocket 21a, the driven sprocket 311a, and the power transmission chain 40, then is input to the deceleration device 30, is further reduced by the planetary gear mechanism 31, and the power is appropriately distributed and transmitted to the left and right rear wheels RW by the differential gear mechanism 32.

Next, the drive unit case 11 will be described with reference to FIGS. 5 to 10.

The drive unit case 11 includes a main case 111, a left side cover 112 covering a left side surface of the main case 111, and a right side cover 113 covering a right side surface of the main case 111. The main case 111 is divided into two portions, left and right, that is, a left main case 114 and a right main case 115.

The main case 111 is divided into a motor chamber 12 that accommodates the drive motor 20, a gear chamber 13 that accommodates the deceleration device 30, a chain chamber 14 that accommodates the power transmission chain 40, and a controller chamber 15 that accommodates the control device 50. The motor chamber 12 and the gear chamber 13 are formed side by side in the front-rear direction such that the motor chamber 12 is located on the front side and the gear chamber 13 is located on the rear side. The chain chamber 14 is formed on the left side of the motor chamber 12 and the gear chamber 13, and is open leftward. The controller chamber 15 is formed on the right side of the motor chamber 12 and the gear chamber 13, and is open rightward.

The left side cover 112 covers a left opening of the chain chamber 14. The oil pump 621 and the oil cooler 63 are fixed to a left side surface of the left side cover 112.

Figure 6:
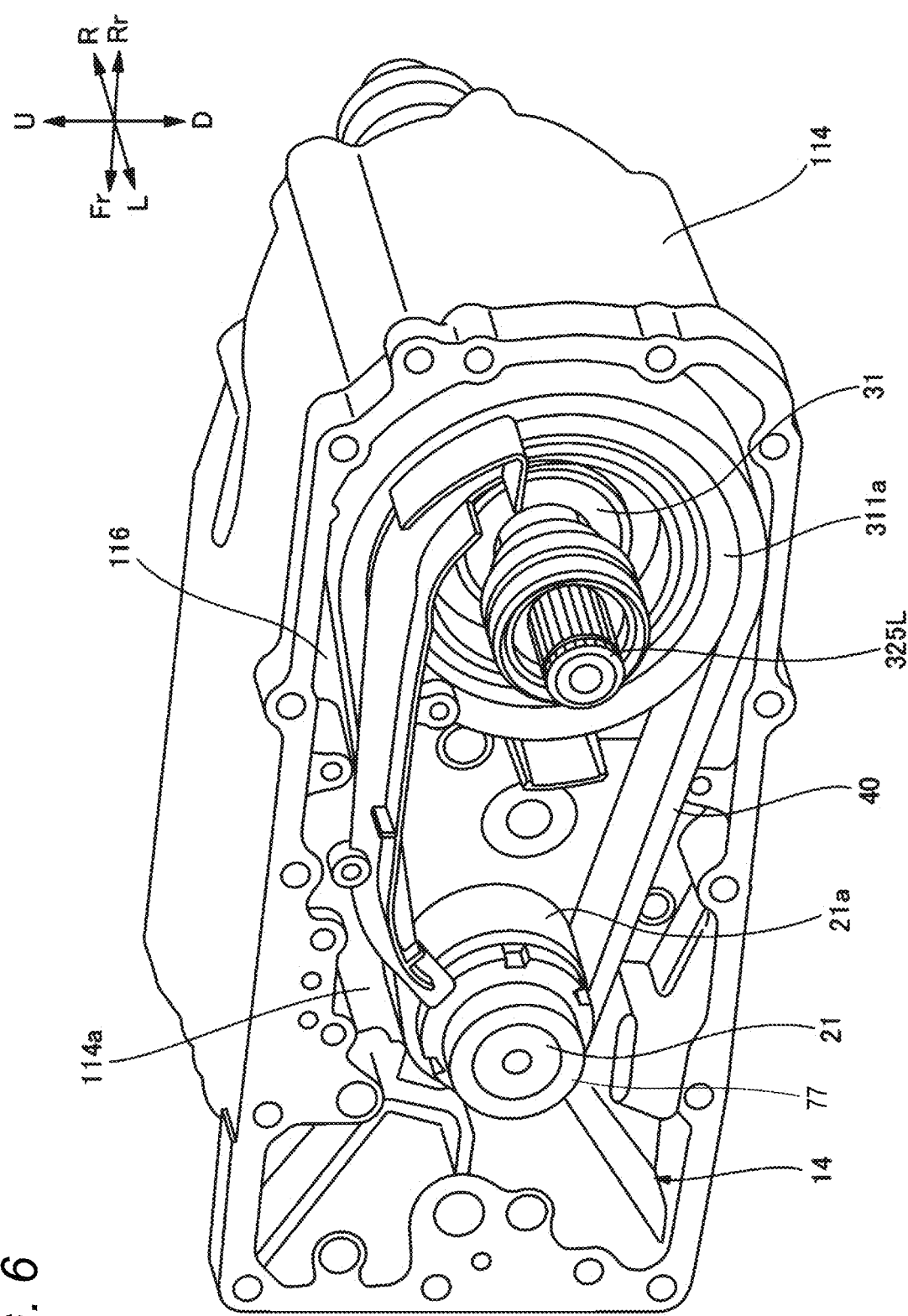
FIG. 6 is a perspective view of a left main case 114 of the drive unit 10 in FIG. 2 when viewed from a left side.
Figure 7:
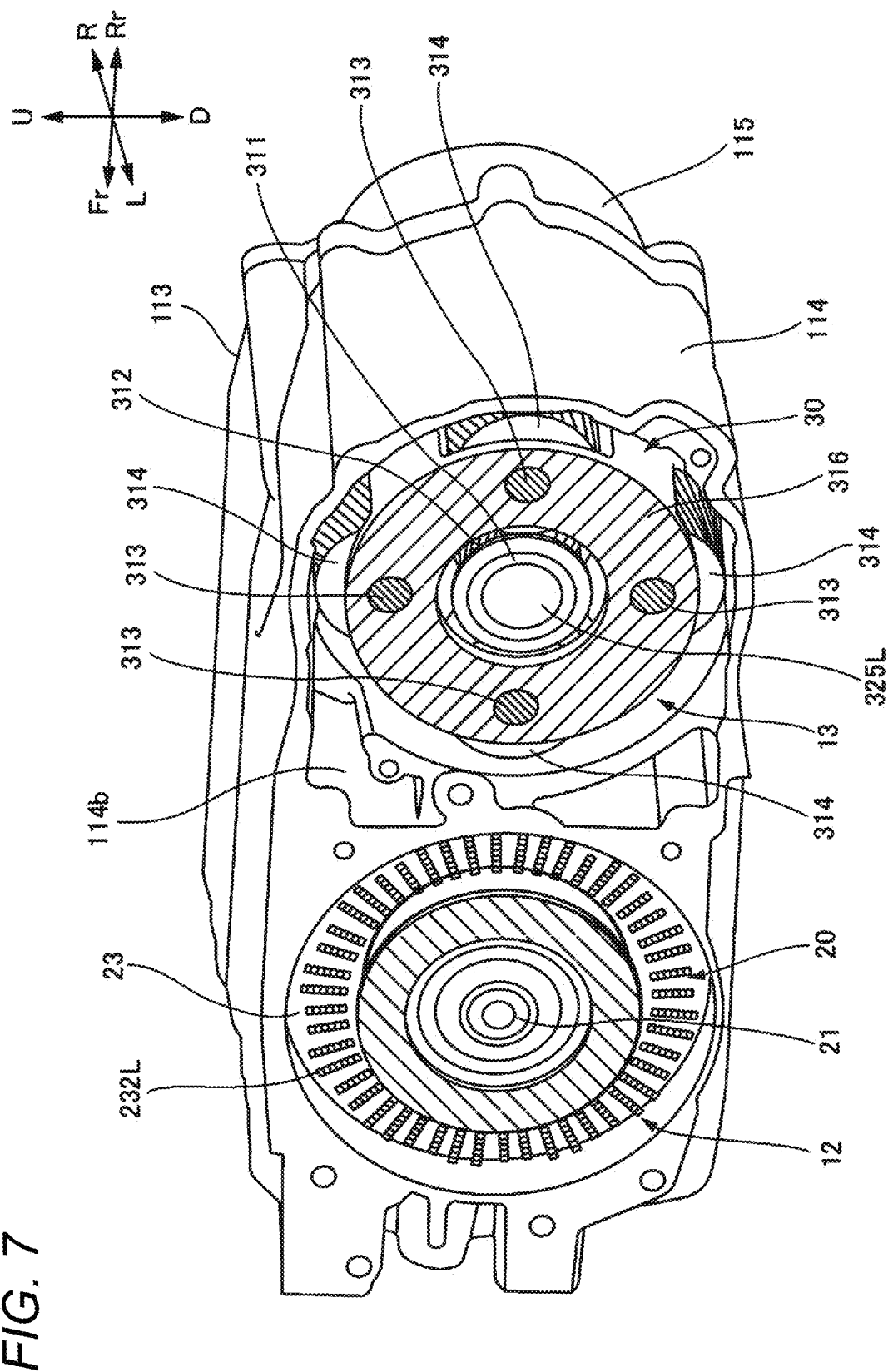
FIG. 7 is a cross-sectional view taken along a line A-A in FIG. 5.
Figure 8:
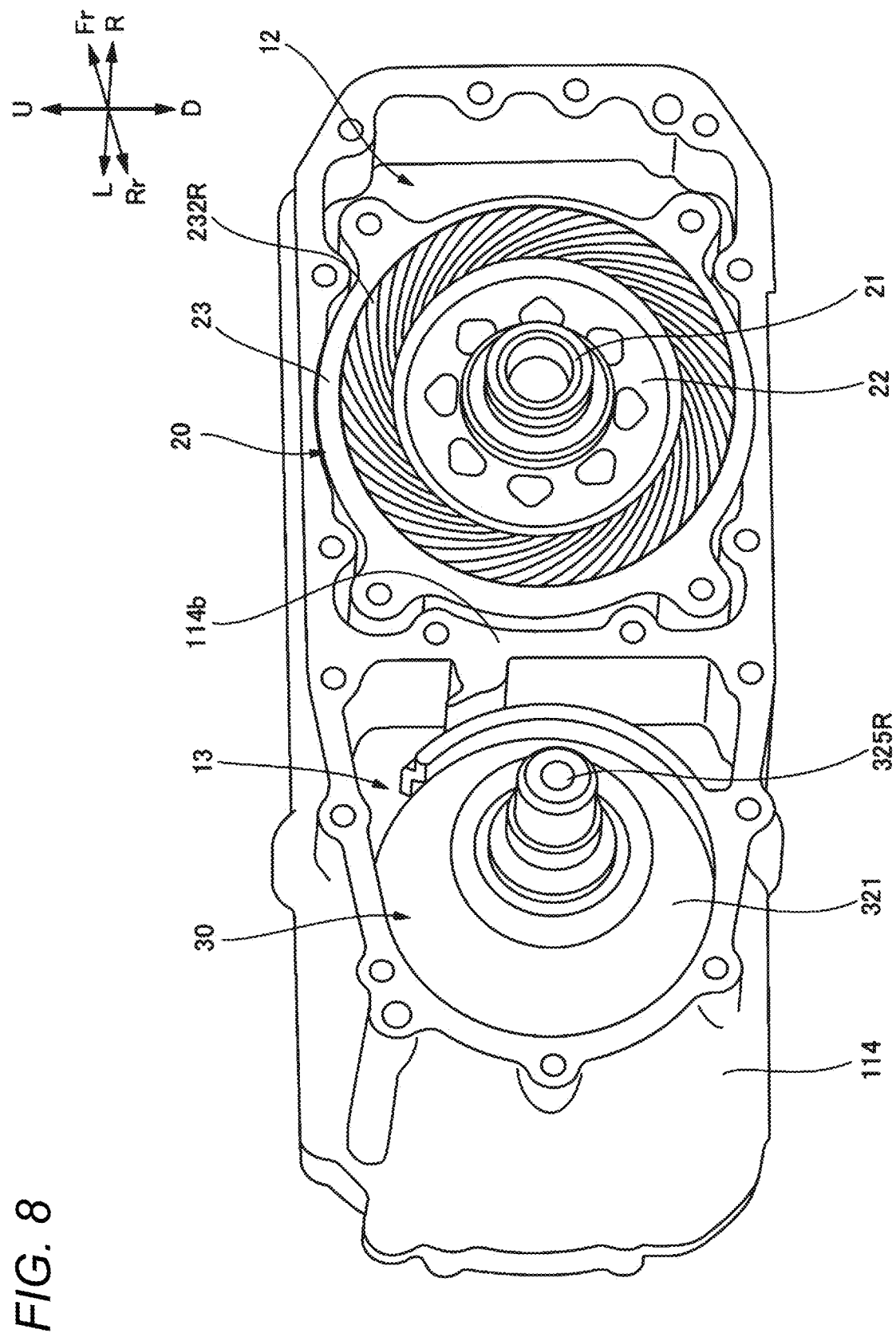
FIG. 8 is a perspective view of the left main case 114 of the drive unit 10 in FIG. 2 when viewed from a right side.

As shown in FIGS. 6 to 8, the left main case 114 forms the motor chamber 12, the gear chamber 13, and the chain chamber 14. The left main case 114 includes a first partition wall 114a partitioning the motor chamber 12 and the chain chamber 14, and a second partition wall 114b partitioning the motor chamber 12 and the gear chamber 13. The first partition wall 114a extends in the upper-lower direction and the front-rear direction between the drive sprocket 21a and the drive motor 20. The second partition wall 114b extends in the upper-lower direction and the left-right direction between the drive motor 20 and the deceleration device 30.

In the left main case 114, the motor chamber 12 is open rightward. In the left main case 114, the gear chamber 13 and the chain chamber 14 communicate with each other, and the left main case 114 is provided with a baffle plate 116 partitioning the gear chamber 13 and the chain chamber 14 (see also FIG. 4). The baffle plate 116 extends in the upper-lower direction and the front-rear direction between the driven sprocket 311a and the sun gear 312.

Figure 9:
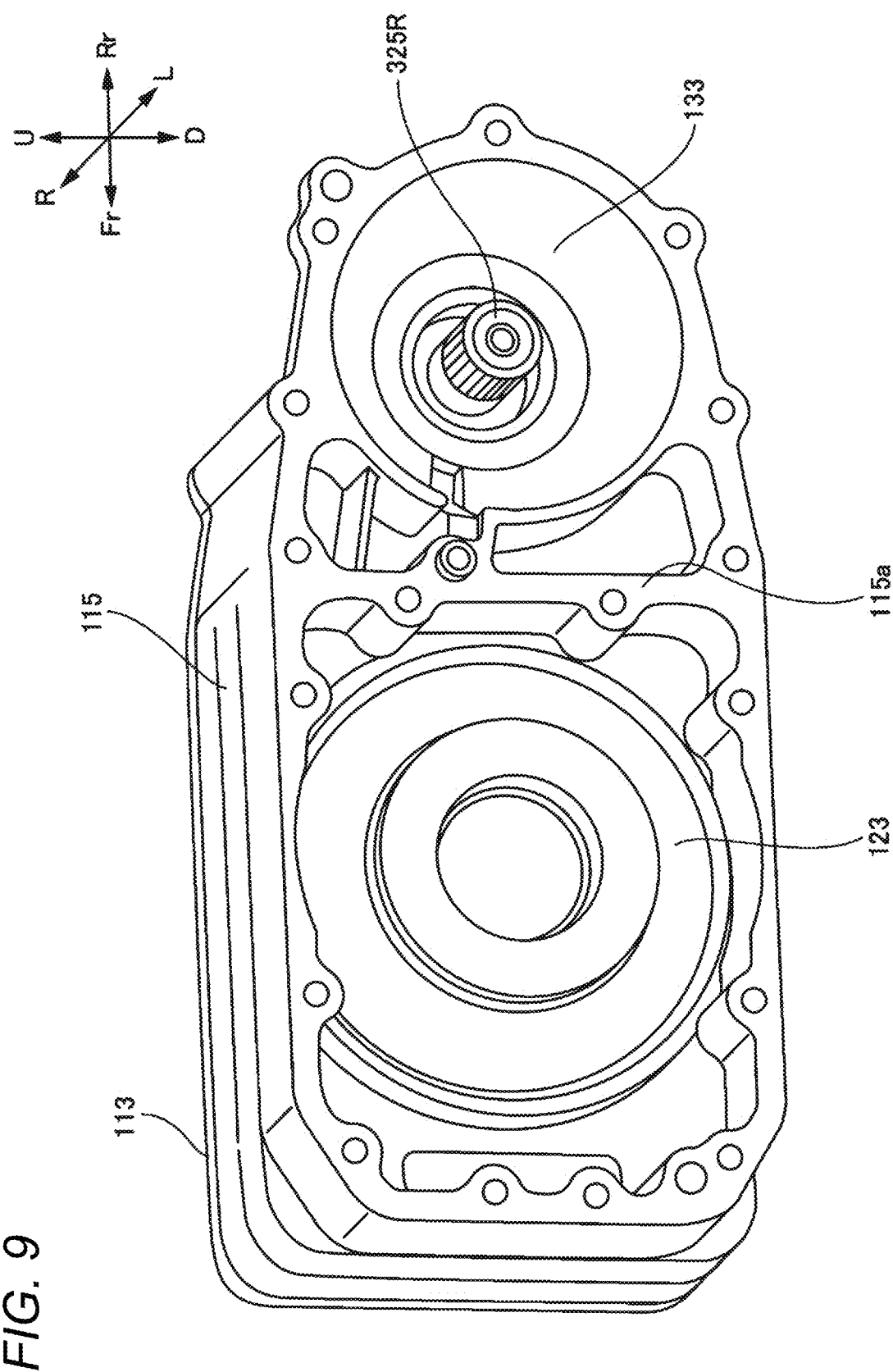
FIG. 9 is a perspective view of a right main case 115 of the drive unit 10 in FIG. 2 when viewed from a left side.
Figure 10:
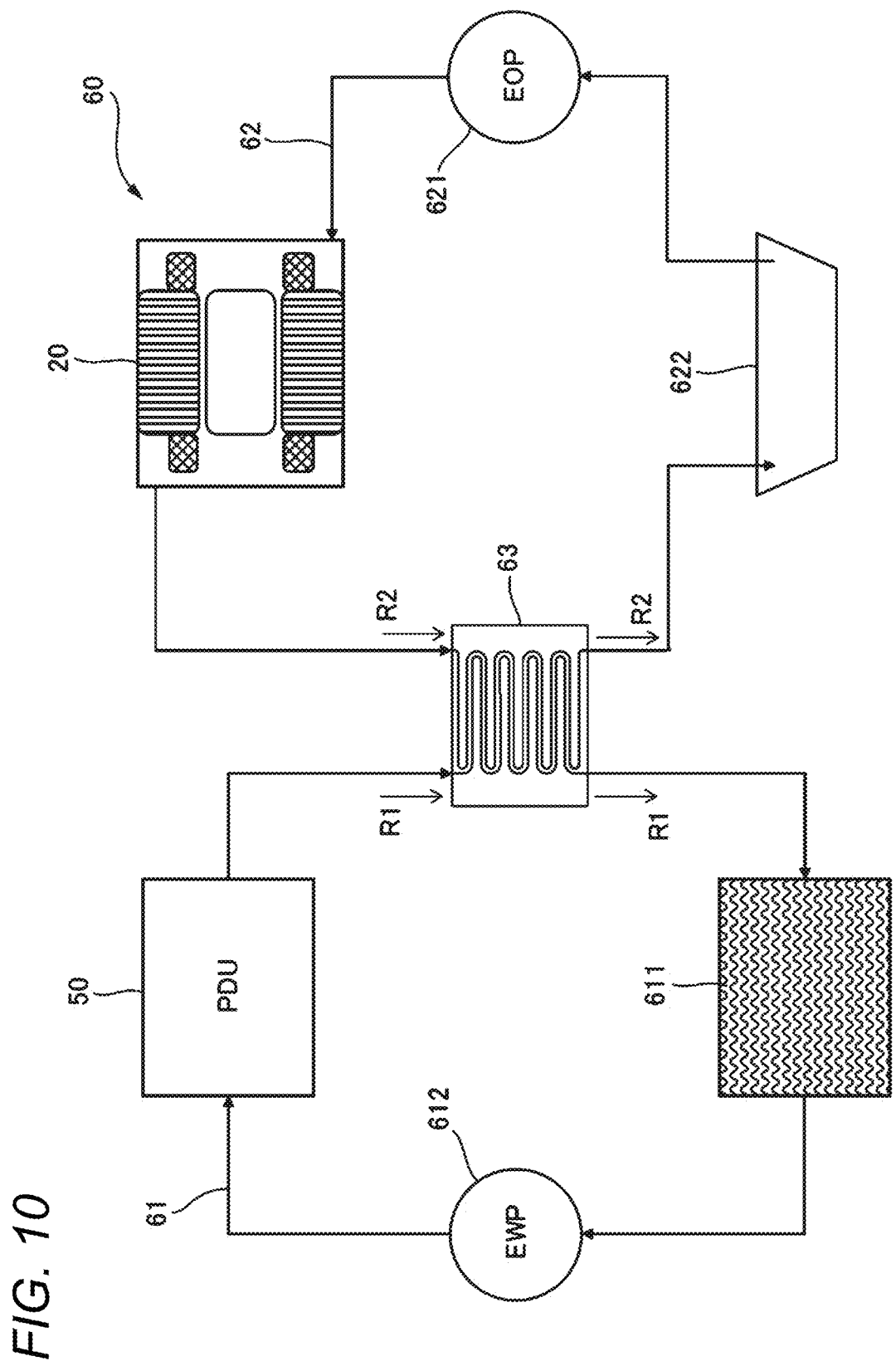
FIG. 10 is a block diagram of a temperature control system in the drive unit in FIG. 2.

As shown in FIGS. 9 and 10, the right main case 115 includes a right wall portion 123 that covers a right opening of the motor chamber 12 formed in the left main case 114. The right main case 115 further includes a right wall portion 133 that covers a right opening of the gear chamber 13 formed in the left main case 114, and a third partition wall 115a that partitions the motor chamber 12 and the gear chamber 13. The right main case 115 forms the controller chamber 15 on the right side of the right wall portion 123 including a front region of the right wall portion 133. In the right main case 115, the controller chamber 15 is open rightward.

The right side cover 113 covers a right opening of the controller chamber 15.

Temperature Control System

Figure 11:
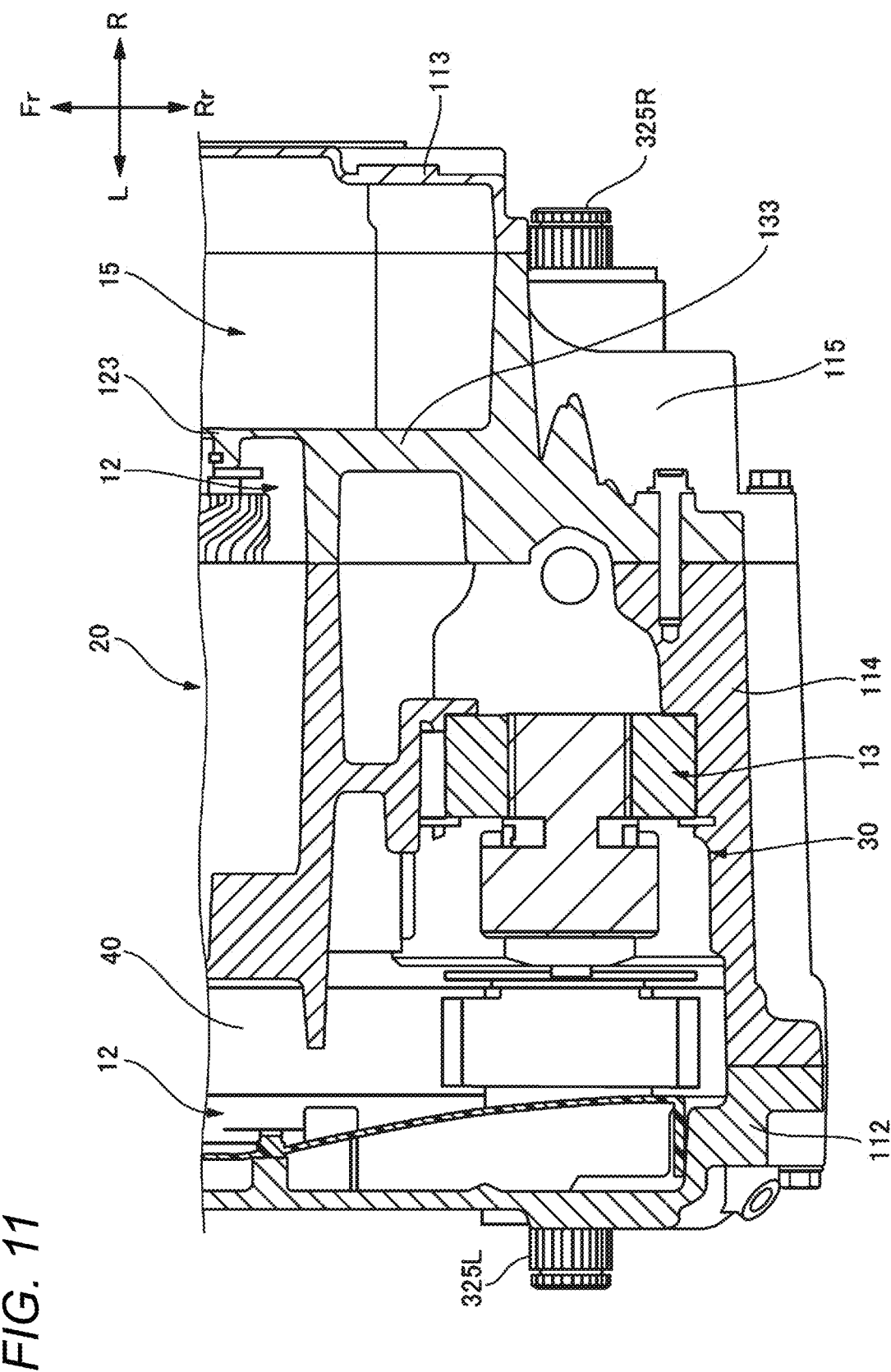
FIG. 11 is a cross-sectional view taken along a line B-B in FIG. 5.

As shown in FIG. 11, the vehicle V includes a temperature control system 60. The temperature control system 60 includes a first temperature control circuit 61 for circulating the above-described cooling water R1 and performing temperature control of the control device 50, a second temperature control circuit 62 for circulating the above-described motor cooling oil R2 and performing temperature control and lubrication of the drive motor 20, and the oil cooler 63 described above. As described above, the oil cooler 63 performs heat exchange between the cooling water R1 circulating in the first temperature control circuit 61 and the motor cooling oil R2 circulating in the second temperature control circuit 62.

In the first temperature control circuit 61, the cooling water R1 circulates through the cooling water pump 612, the control device 50, the oil cooler 63, and the radiator 611. The cooling water R1 pumped from the cooling water pump 612 is supplied to the control device 50 to control a temperature of the control device 50, then supplied from the control device 50 to the oil cooler 63 to perform heat exchange with the motor cooling oil R2 flowing through the second temperature control circuit 62, supplied to the radiator 611, cooled by heat exchange with external air, and then returned to the cooling water pump 612.

In the second temperature control circuit 62, the motor cooling oil R2 circulates through the oil pump 621, the drive motor 20, and the oil cooler 63. The inside of the drive unit case 11 is formed with a storage portion 622 for temporarily storing the motor cooling oil R2 cooled by the oil cooler 63. The motor cooling oil R2 temporarily stored in the storage portion 622 is pumped from the oil pump 621 and supplied into the drive unit case 11 to control a temperature of the drive motor 20. The motor cooling oil R2 is supplied from the drive unit case 11 to the oil cooler 63, cooled by heat exchange with the cooling water R1 flowing through the first temperature control circuit 61, and then flows into the storage portion 622 and is temporarily stored in the storage portion 622 again.

The gear chamber 13 and the chain chamber 14 partitioned by the baffle plate 116 store a common fluid, that is, a lubricating oil R3. The lubricating oil R3 is, for example, an oil called an automatic transmission fluid (ATF). The lubricating oil R3 may be the same oil as the motor cooling oil R2, and is not mixed with the motor cooling oil R2 circulating through the second temperature control circuit 62. The lubricating oil R3 lubricates the deceleration device 30 provided in the gear chamber 13, and the drive sprocket 21a, the driven sprocket 311a, the power transmission chain 40, and the like provided in the chain chamber 14.

Next, the chain chamber 14 and lubrication in the chain chamber 14 will be described in more detail.

Figure 12:
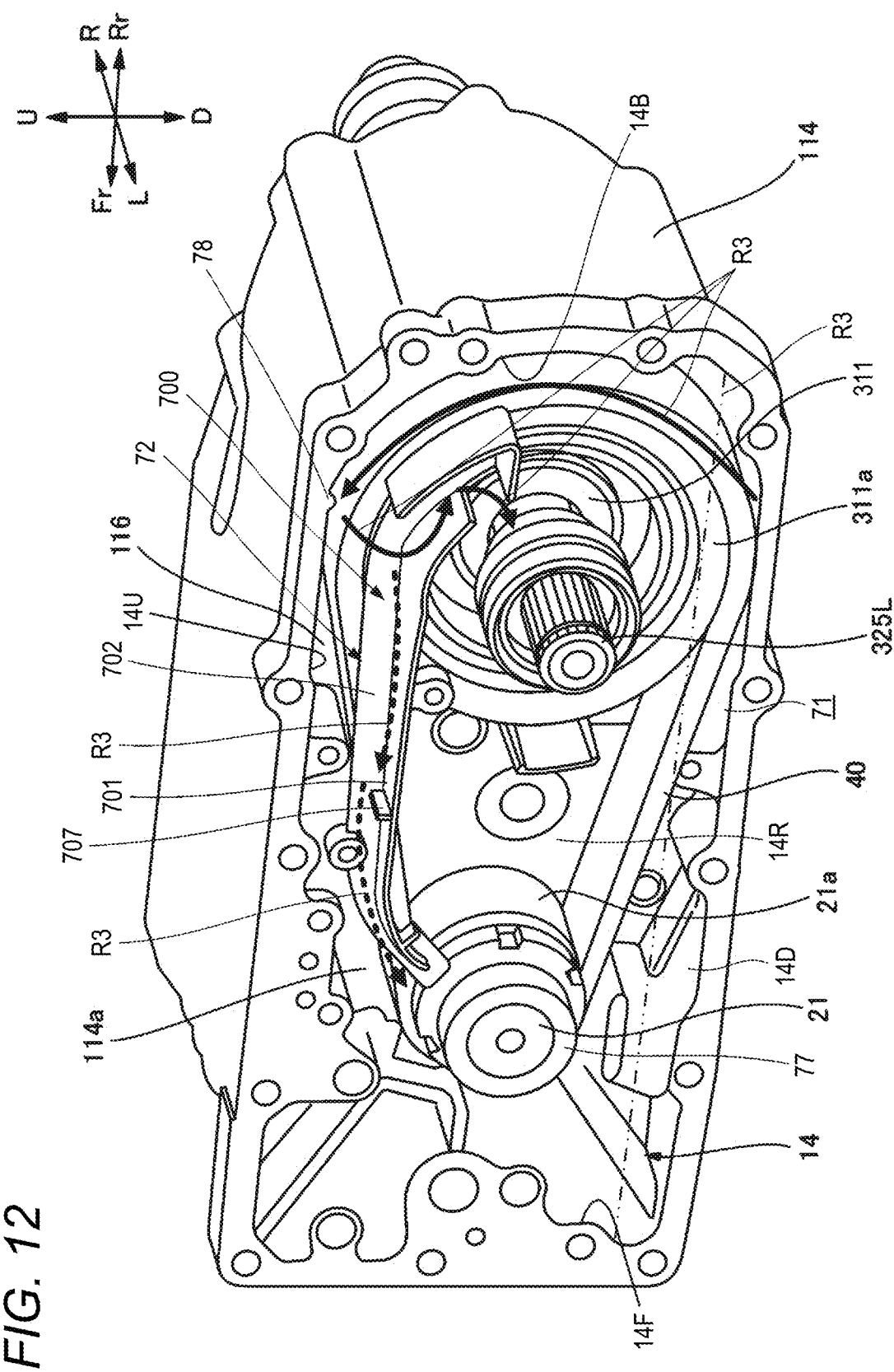
FIG. 12 is a perspective view of the left main case 114 of the drive unit 10 as viewed from the left side for showing a flow of a lubricating oil R3 in a chain chamber 14.
Figure 13:
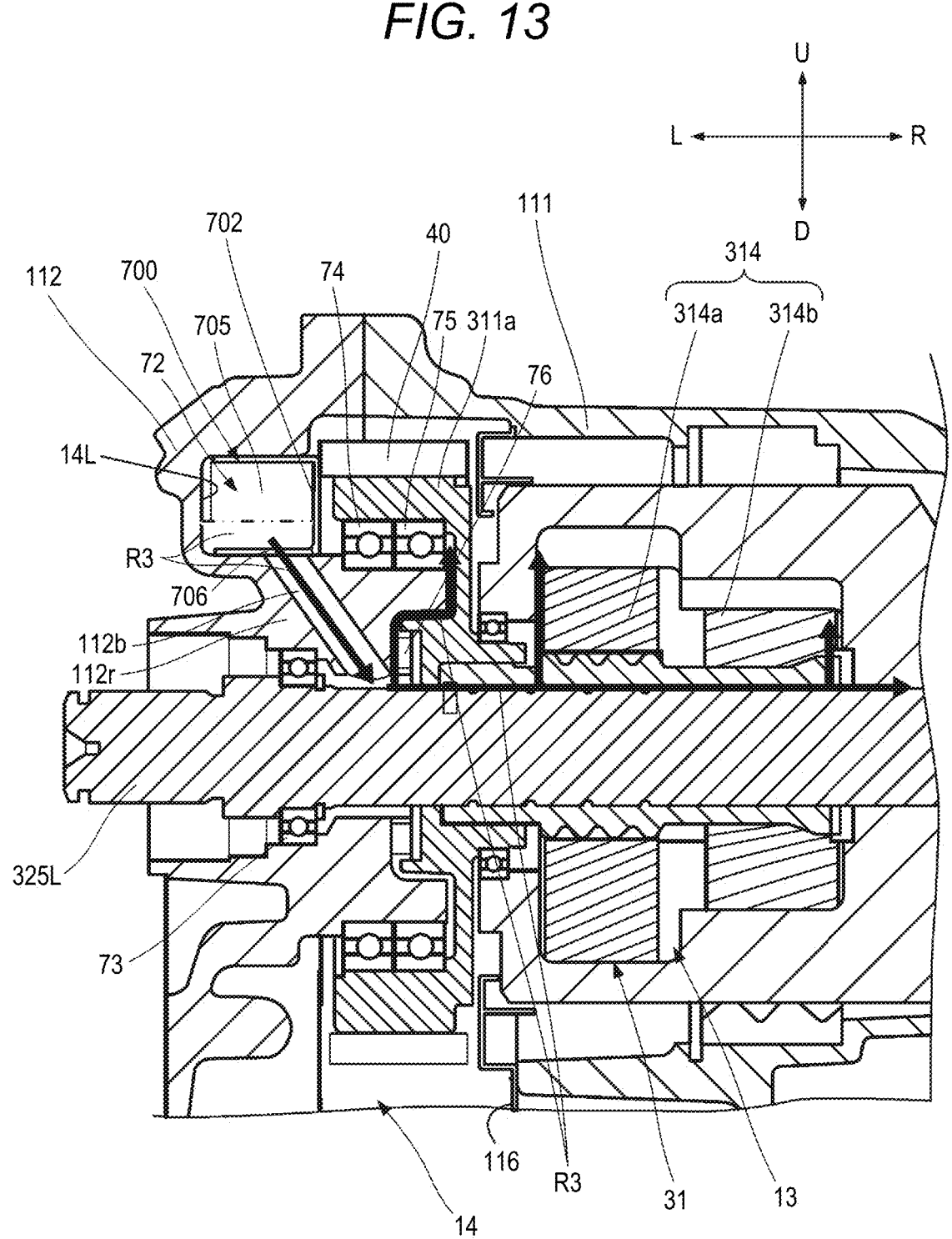
FIG. 13 is a partial cross-sectional view of the drive unit 10 for showing the flow of the lubricating oil R3.

As shown in FIGS. 12 and 13, the chain chamber 14 is a space formed by assembling a recess provided in the left main case 114 and a recess provided in the left side cover 112 in a manner of facing each other, and has a front surface 14F, a bottom surface 14D, a rear surface 14B, a ceiling 14U, a left side surface 14L, and a right side surface 14R. As described above, the right side surface 14R is formed by the first partition wall 114a of the left main case 114 whose left side is open and the baffle plate 116 that partitions the gear chamber 13 and the chain chamber 14, and the left side surface 14L is formed by the left side cover 112 that covers an opening of the left main case 114. The baffle plate 116 has a disc-like and annular shape, and the input shaft 311 is inserted therein.

As described above, in the chain chamber 14, the drive sprocket 21a provided at the left end of the drive shaft 21 is disposed on the front side, the driven sprocket 311a provided at the left end of the input shaft 311 is disposed on the rear side, and the endless power transmission chain 40 is wound around the drive sprocket 21a and the driven sprocket 311a.

Further, the left drive shaft 325L is disposed in the chain chamber 14 in a manner of being inserted through the hollow portion of the input shaft 311 and the center of the driven sprocket 311a. As shown in FIG. 13, the left drive shaft 325L is rotatably supported by a bearing 73 (radial bearing) provided at an inner peripheral surface of a hollow rear boss portion 112r of the left side cover 112, and the left end thereof is exposed from the drive unit case 11. Two bearings 74 and 75 (radial bearings) are disposed side by side on an outer peripheral surface of the rear boss portion 112r of the left side cover 112, and rotatably support the driven sprocket 311a. Reference numeral 76 indicates a bearing (thrust bearing) disposed between the rear boss portion 112r of the left side cover 112 and a base portion of the driven sprocket 311a.

The drive shaft 21 is rotatably supported by a bearing 77 (radial bearing) provided on an inner peripheral surface of a hollow front boss portion 112f (see FIG. 2) of the left side cover 112.

A first storage portion 71 in which the lubricating oil R3 is stored is provided at the bottom surface 14D of the chain chamber 14. When an amount of the lubricating oil R3 stored in the first storage portion 71 is large, agitation loss of the driven sprocket 311a and the power transmission chain 40 immersed in the lubricating oil R3 increases, and thus a liquid surface of the lubricating oil R3 is set to be located below the input shaft 311, preferably below the drive sprocket 21a.

Therefore, in order to appropriately lubricate the inside of the chain chamber 14, it is necessary to pick up the lubricating oil R3 along with rotation of the driven sprocket 311a and the power transmission chain 40, and it is necessary to stably spread the lubricating oil R3 into the chain chamber 14 even when there is a rotation fluctuation of the driven sprocket 311a.

Therefore, the chain chamber 14 is provided with a second storage portion 72 that is located above the input shaft 311 and stores the lubricating liquid. In the present embodiment, the second storage portion 72 is formed by the left side surface 14L constituted by the left side cover 112 and a guide member 700 separate from the left side cover 112.

The guide member 700 is made of, for example, resin, and is provided on the left side of the driven sprocket 311a to be adjacent to the driven sprocket 311a as shown in FIG. 13. As shown in FIG. 12, the guide member 700 includes a bottom surface portion 701 that extends in the left-right direction that is a rotation axis direction of the driven sprocket 311a, and a side surface portion 702 that stands upright in a manner of intersecting the bottom surface portion 701 and faces the left side surface 14L of the left side cover 112, and an upper portion of the guide member 700 is opened. A height of the bottom surface portion 701 is set to be substantially the same height as that of an uppermost portion of the driven sprocket 311a.

Figure 14:
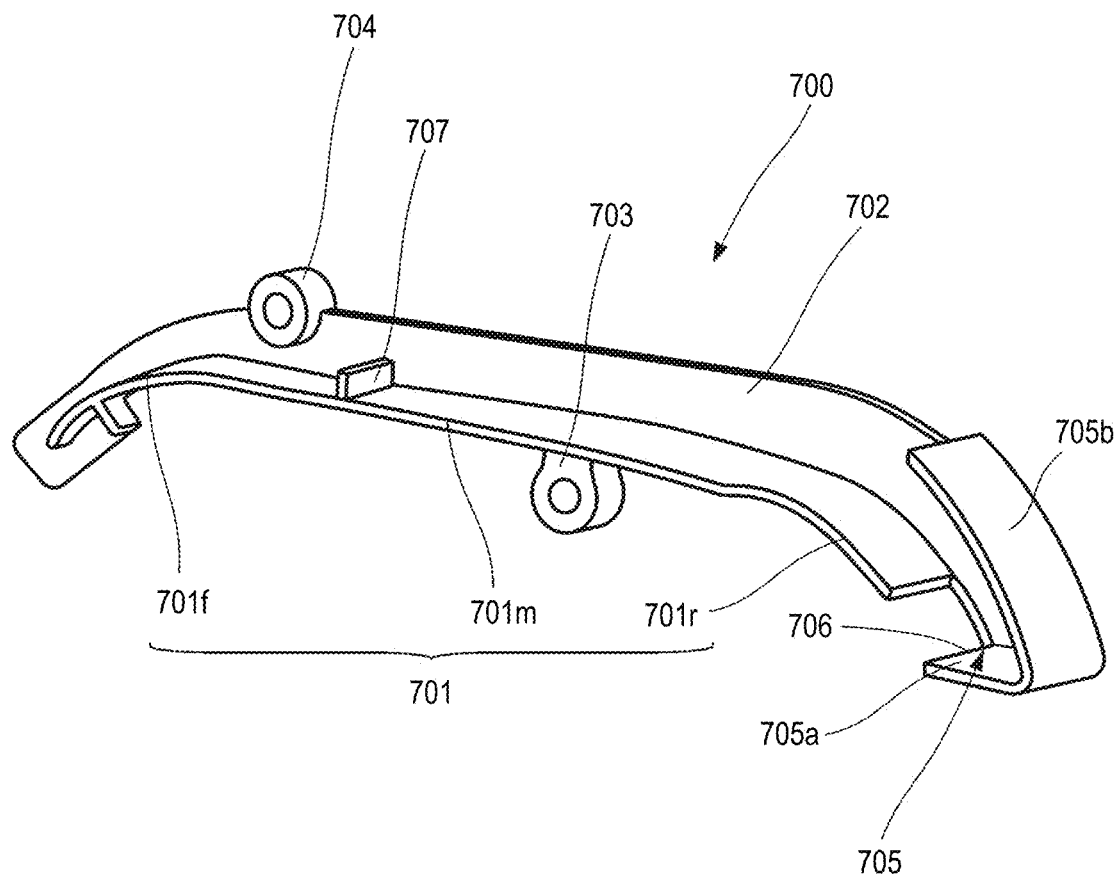
FIG. 14 is a perspective view of a guide member 700.

In the present embodiment, as shown in FIG. 12, the bottom surface portion 701 extends in the front-rear direction from above the input shaft 311 to above the drive shaft 21. Referring also to FIG. 14, the bottom surface portion 701 includes a main bottom surface portion 701*m* extending in a substantially horizontal direction, a front bottom surface portion 701*f* located in front of the main bottom surface portion 701*m* and curved downward toward the front side to extend toward the bearing 77 supporting the drive shaft 21, and a rear bottom surface portion 701*r* located behind the main bottom surface portion 701*m* and curved downward toward the rear side. The rear bottom surface portion 701*r* is formed along an outer peripheral surface of the driven sprocket 311*a* when viewed in the left-right direction.

The side surface portion 702 extends substantially vertically upward from a right end of the bottom surface portion 701. The bottom surface portion 701 and the side surface portion 702 are respectively provided with fixing portions 703 and 704 for fastening the guide member 700 to the left side cover 112 by bolts.

A pocket portion 705 is provided behind the rear bottom surface portion 701*r*. The pocket portion 705 includes a horizontal portion 705*a* extending substantially horizontally rearward from a rear end of the rear bottom surface portion 701*r*, and a coupling portion 705*b* that is located above the rear bottom surface portion 701*r*, faces the rear bottom surface portion 701*r*, and couples a rear end of the horizontal portion 705*a* to the side surface portion 702.

A notch 706 is provided at a boundary between the rear bottom surface portion 701*r* and the horizontal portion 705*a*. Accordingly, as shown in FIG. 13, the lubricating oil R3 accumulated in the pocket portion 705 flows through the notch 706 to a rear communication passage 112*b* formed in the rear boss portion 112*r* of the left side cover 112 in a manner of being in contact with the notch 706. An amount of the lubricating oil R3 flowing out of the rear communication passage 112*b* is basically smaller than an amount of the lubricating oil R3 flowing into the pocket portion 705.

Referring back to FIG. 14, at the horizontal portion 705*a*, a weir portion 707 is formed between the driven sprocket 311*a* and the drive sprocket 21*a* when viewed in the left-right direction. The weir portion 707 is lower in height than the side surface portion 702, and has a function of storing the lubricating oil R3 on the guide member 700 together with the pocket portion 705.

In the chain chamber 14 configured as described above, when the drive shaft 21 and the drive sprocket 21*a* attached to the drive shaft 21 rotate integrally due to power generated by the drive motor 20, and the driven sprocket 311*a* and the power transmission chain 40 rotate accordingly, the lubricating oil R3 stored in the first storage portion 71 is picked up by the driven sprocket 311*a* and the power transmission chain 40. As indicated by a solid arrow in FIG. 12, the lubricating oil R3 that is picked up is transmitted to the ceiling 14U through the rear surface 14B of the chain chamber 14.

Here, on the ceiling 14U, a protrusion 78 extending downward toward the second storage portion 72 extends in the left-right direction toward the drive sprocket 21*a* (front side) relative to the pocket portion 705 and toward the driven sprocket 311*a* (rear side) relative to the weir portion 707 when viewed in the left-right direction. Therefore, the lubricating oil R3 flowing along the ceiling 14U hits the protrusion 78 and falls downward. The protrusion 78 is formed across the left main case 114 and the left side cover 112.

Since the guide member 700 is located below the protrusion 78, the lubricating oil R3 is stored in the second storage portion 72 constituted by the left side cover 112 and the guide member 700. The lubricating oil R3 scattered to the side surface of the chain chamber 14 is deflected by the left side cover 112 and the baffle plate 116 and stored in the second storage portion 72. The lubricating oil R3 stored in the second storage portion 72 flows toward the pocket portion 705 since movement toward the drive sprocket 21*a* is restricted by the weir portion 707. As shown in FIG. 13, the lubricating oil R3 accumulated in the pocket portion 705 flows through the notch 706 to the rear communication passage 112*b* formed in the rear boss portion 112*r* of the left side cover 112 in a manner of being in contact with the notch 706.

The rear communication passage 112*b* communicates with a gap between the inner peripheral surface of the rear boss portion 112*r* of the left side cover 112 and the left drive shaft 325L. The lubricating oil R3 flowing through the rear communication passage 112*b* is supplied to the bearings 74, 75, and 76 that support the driven sprocket 311*a* in a manner of being rotatable with respect to the rear boss portion 112*r* of the left side cover 112. The lubricating oil R3 flowing through the rear communication passage 112*b* is supplied to the bearing 73 that supports the left drive shaft 325L in a manner of being rotatable with respect to the rear boss portion 112*r* of the left side cover 112, and is supplied to the planetary gear mechanism 31 of the gear chamber 13 through a gap between the input shaft 311 and the left drive shaft 325L.

Referring back to FIG. 12, when the lubricating oil R3 accumulated in the second storage portion 72 exceeds the weir portion 707, the lubricating oil R3 flows through the front bottom surface portion 701*f* as indicated by a dashed arrow in FIG. 12. The lubricating oil R3 is supplied, through a front communication passage (not shown) formed in the front boss portion 112*f* (see FIG. 2) of the left side cover 112, to the bearing 77 that supports the drive shaft 21 in a manner of being rotatable with respect to the front boss portion 112*f* of the left side cover 112.

In this way, the chain chamber 14 is provided with the first storage portion 71 that is provided at the bottom surface 14D and stores the lubricating oil R3 such that a part of the driven sprocket 311*a* is immersed therein, and the second storage portion 72 that is located above the input shaft 311 and stores the lubricating oil R3, thus the lubricating oil R3 can be supplied stably regardless of a fluctuation in a rotation speed of the driven sprocket 311*a*. Accordingly, by storing the lubricating oil R3 in the second storage portion 72, it is possible to prevent a decrease in lubrication efficiency due to vibrations and other disturbances during traveling.

Since the guide member 700 is formed separately from the left side cover 112, and the guide member 700 and the left side cover 112 form the second storage portion 72, the guide member 700 can be lighter. As compared with a case where the second storage portion 72 is formed only by the guide member 700, a shape of a mold forming the guide member 700 can be simplified, and thus manufacturing cost can be reduced.

Further, since the guide member 700 directly supplies the lubricating oil R3 to the bearings 74, 75, and 76 that rotatably support the driven sprocket 311*a* and the bearing 77 that rotatably supports the drive shaft 21, even though an amount of the lubricating oil R3 is smaller than when the lubricating oil R3 is dripped from above, it is possible to prevent a decrease in lubrication efficiency due to vibrations and other disturbances during traveling.

Although the embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, the constituent elements in the above embodiment may be freely combined without departing from the gist of the invention.

The embodiment of the present invention has been described above, but the present invention is not limited to the embodiment described above, and modifications, improvements, and the like can be made as appropriate.

In this specification, at least the following matters are described. Although corresponding constituent elements or the like in the embodiment described above are shown in parentheses, the present invention is not limited thereto.

(1) A power transmission device (drive unit 10) including:
a first rotation member (driven sprocket 311a);
a first rotation shaft (input shaft 311) supporting the first rotation member; and
a case (drive unit case 11) rotatably supporting the first rotation shaft, in which
the case includes
a rotation member accommodation chamber (chain chamber 14) accommodating the first rotation shaft and the first rotation member,
a first storage portion (first storage portion 71) provided at a bottom portion (bottom surface 14D) of the rotation member accommodation chamber and configured to store a lubricating liquid (lubricating oil R3) such that a portion of the first rotation member is immersed therein, and
a second storage portion (second storage portion 72) provided above the first rotation shaft in the rotation member accommodation chamber and configured to store the lubricating liquid.

According to (1), the second storage portion is provided separately from the first storage portion provided at the bottom portion, the lubricating liquid is stored in the second storage portion, and thus the lubricating liquid can be supplied stably regardless of a fluctuation in a rotation speed of the first rotation member. Accordingly, by storing the lubricating liquid in the second storage portion, it is possible to prevent a decrease in lubricating efficiency due to vibrations and other disturbances during traveling.

(2) The power transmission device according to (1), in which
the second storage portion is configured to store the lubricating liquid picked up from the first storage portion by rotation of the first rotation member.

According to (2), using rotation of the first rotation member, the lubricating liquid can be supplied to the second storage portion.

(3) The power transmission device according to (1), in which
the second storage portion is formed by a side surface (left side surface 14L) of the case and a guide member (guide member 700) separate from the case,
the guide member has
a bottom surface portion (bottom surface portion 701) extending in a rotation axis direction of the first rotation member and
a side surface portion (side surface portion 702) that stands on the bottom surface portion intersecting with the bottom surface portion and faces the side surface of the case, and
an upper portion of the guide member is opened.

According to (3), a weight of the guide member can be reduced by forming the second storage portion using a wall surface of the case. As compared with a case where the second storage portion is formed only by the guide member, a shape of a mold forming the guide member can be simplified, and thus manufacturing cost can be reduced.

(4) The power transmission device according to (1), in which
the case includes a communication passage (rear communication passage 112b) communicating the second storage portion to a first lubrication portion of the rotation member accommodation chamber.

According to (4), the lubricating liquid can be easily supplied to the first lubrication portion.

(5) The power transmission device according to (4), in which
the first lubrication portion is a region in which a bearing (bearings 74, 75, and 76) is disposed, the bearing rotatably supporting the first rotation member relative to the case.

According to (5), heat generation and seizure of the bearing can be prevented.

(6) The power transmission device according to (1), in which
the case has a protrusion (protrusion 78) extending from a wall surface (ceiling 14U) located above the second storage portion toward the second storage portion.

According to (6), the lubricating liquid in the first storage portion is picked up by rotation of the first rotation member, and when there is excessive momentum, the lubricating liquid scatters beyond the second storage portion, and thus the lubricating liquid can be dropped into the second storage portion by providing the protrusion on the ceiling of the case. Since the protrusion can be integrally formed with the ceiling of the case, the protrusion can be formed at low cost by casting.

(7) The power transmission device according to (3), further including:
a second rotation member (drive sprocket 21a); and
a second rotation shaft (drive shaft 21) extending parallel to the first rotation shaft and supporting the second rotation member, in which
the second storage portion extends from above the first rotation shaft to above the second rotation shaft, and
the bottom surface portion of the guide member has a weir portion (weir portion 707) standing on the bottom surface portion between the first rotation member and the second rotation member.

According to (7), the lubricating liquid can be appropriately stored in the second storage portion.

(8) The power transmission device according to (7), in which
the weir portion is lower in height than the side surface portion, and
the guide member extends toward a bearing (bearing 77) that rotatably supports the second rotation shaft.

According to (8), the lubricating liquid exceeding the weir portion can be supplied to the bearing that rotatably supports the second rotation shaft. Instead of dripping the lubricating liquid from above the bearing, the guide member is extended to the second rotation shaft and the lubricating liquid is directly supplied from the guide member through another communication passage, for example, and thus lubrication efficiency can be prevented from being lowered due to vibrations and other disturbances during traveling even with a small amount of the lubricating liquid.

(9) The power transmission device according to (1), in which
the second storage portion is disposed on one side in a rotation axis direction with respect to the first rotation member, and
a baffle plate (baffle plate 116) is provided on another side in the rotation axis direction with respect to the first rotation member in a manner of being substantially perpendicular to the first rotation shaft.

The lubricating liquid in the first storage portion is scattered along an inner wall of the case due to rotation of the first rotation member, and the lubricating liquid scattered to a side opposite to the second storage portion does not enter the second storage portion directly. According to (9), the lubricating liquid can be deflected to the second storage portion by the baffle plate, and the lubricating liquid can be efficiently accumulated in the second storage portion.

(10) The power transmission device according to (9), in which
the baffle plate has a disc-like and annular shape.

According to (10), elements of the power transmission device can be disposed in a manner of being inserted through the inside of the baffle plate.

What is claimed is:

1. A power transmission device comprising:
   a first rotation member;
   a first rotation shaft supporting the first rotation member; and
   a case rotatably supporting the first rotation shaft, wherein the case includes
      a rotation member accommodation chamber accommodating the first rotation shaft and the first rotation member,
      a first storage portion provided at a bottom portion of the rotation member accommodation chamber and configured to store a lubricating liquid such that a portion of the first rotation member is immersed therein, and
      a second storage portion provided above the first rotation shaft in the rotation member accommodation chamber and configured to store the lubricating liquid,
   the second storage portion is formed by a side surface of the case and a guide member separate from the case,
   the guide member has:
      a bottom surface portion extending in a rotation axis direction of the first rotation member; and
      a side surface portion that stands on the bottom surface portion intersecting with the bottom surface portion and faces the side surface of the case, and
   an upper portion of the guide member is opened, wherein the power transmission device further comprises:
      a second rotation member; and
      a second rotation shaft extending parallel to the first rotation shaft and supporting the second rotation member,
   the second storage portion extends from above the first rotation shaft to above the second rotation shaft, and
   the bottom surface portion of the guide member has a weir portion standing on the bottom surface portion between the first rotation member and the second rotation member.

2. The power transmission device according to claim 1, wherein
   the second storage portion is configured to store the lubricating liquid picked up from the first storage portion by rotation of the first rotation member.

3. The power transmission device according to claim 1, wherein
   the case includes a communication passage communicating the second storage portion to a first lubrication portion of the rotation member accommodation chamber.

4. The power transmission device according to claim 3, wherein
   the first lubrication portion is a region in which a bearing is disposed, the bearing rotatably supporting the first rotation member relative to the case.

5. The power transmission device according to claim 1, wherein
   the case has a protrusion extending from a wall surface located above the second storage portion toward the second storage portion.

6. The power transmission device according to claim 1, wherein
   the weir portion is lower in height than the side surface portion, and
   the guide member extends toward a bearing that rotatably supports the second rotation shaft.

7. The power transmission device according to claim 1, wherein
   the second storage portion is disposed on one side in a rotation axis direction with respect to the first rotation member, and
   a baffle plate is provided on another side in the rotation axis direction with respect to the first rotation member in a manner of being substantially perpendicular to the first rotation shaft.

8. The power transmission device according to claim 7, wherein
   the baffle plate has a disc-like and annular shape.

* * * * *